United States Patent [19]

Kim

[11] 4,409,165
[45] Oct. 11, 1983

[54] METHOD AND APPARATUS FOR EXTRUDING A CELLULAR PRODUCT

[75] Inventor: Hueng T. Kim, Avon Lake, Ohio

[73] Assignee: The B. F. Goodrich Company, Akron, Ohio

[21] Appl. No.: 274,921

[22] Filed: Jun. 18, 1981

[51] Int. Cl.³ .................................................. B29D 27/00
[52] U.S. Cl. ................................. 264/53; 264/176 R;
264/DIG. 5; 425/208; 425/209; 425/817 C;
521/145
[58] Field of Search ................ 264/53, 51, 50, 176 R,
264/DIG. 5; 521/145; 425/208, 209, 817 C

[56] References Cited

U.S. PATENT DOCUMENTS

| | | | |
|---|---|---|---|
| 2,928,130 | 3/1960 | Gray | 264/50 |
| 3,310,617 | 3/1967 | Dygert et al. | 264/53 |
| 3,366,580 | 1/1968 | Kraemer et al. | 521/145 |
| 3,444,283 | 5/1969 | Carlson | 264/53 |
| 3,451,103 | 6/1969 | Aykanian et al. | 264/53 X |
| 3,538,203 | 11/1970 | Overcashier et al. | 264/53 |
| 3,666,386 | 5/1972 | McElroy et al. | 425/208 X |
| 3,787,542 | 1/1974 | Gallagher et al. | 264/53 X |
| 3,814,779 | 6/1974 | Wiley | 264/53 |
| 3,940,467 | 2/1976 | Brachman | 264/53 X |
| 3,956,438 | 5/1976 | Schippers | 264/53 X |
| 4,118,163 | 10/1978 | Lee | 425/208 X |
| 4,181,647 | 1/1980 | Beach | 264/53 X |
| 4,185,060 | 1/1980 | Ladney | 264/176 R X |

Primary Examiner—Philip E. Anderson
Attorney, Agent, or Firm—George A. Kap

[57] ABSTRACT

Cellular thermoplastic resin is made by the method and extrusion apparatus that is characterized by a compaction section where the resin is densified, a choke section where a barrier of the densified resin is formed that is substantially impervious to a gaseous blowing agent, and a mixing section where the particulate resin is mixed with a blowing agent and then melted before being extruded into a zone of lower pressure whereby the blowing agent expands to form the cellular product. By mixing the blowing agent with a solid rather than a molten resin, the resulting mixture can be melted at a substantially lower temperature.

10 Claims, 4 Drawing Figures

METHOD AND APPARATUS FOR EXTRUDING A CELLULAR PRODUCT

BACKGROUND OF THE INVENTION

Foamed polymeric resins have been produced in the past by a continuous method using a suitable screw extrusion apparatus. Pursuant to the prior art method, a cellular product is produced by feeding a particulate polymeric resin into an extruder, melting it by conveying same through a heated section in the first stage of the extruder, and injecting a blowing agent into the molten resin at the beginning of the second stage of the extruder. This is followed by the steps of mixing and cooling the mixture of the molten resin and the blowing agent in the second stage of the extruder where mixing is effected by means of the action of the screw flights and/or other means associated with the screw, and finally extruding the mixture through a die into a zone of lower pressure whereupon the blowing agent expands forming the cellular product. Generally, two extruders are used to provide sufficient cooling capacity.

The problem with the prior art practice resides in the fact that the resin, such as chlorinated polyvinyl chloride resin, is heated to about 400° F. in the first stage in order to melt same and then it is cooled to about 300° F. in the second stage for proper foaming. The difference of about 100° F. between first and second stages imposes a heavy burden on the equipment to provide adequate heating followed by a large cooling capacity. Furthermore, another disadvantage of the prior art practice is that absorption of the blowing agent into molten resin is very slow and requires a longer mixing stage.

It is desirable to process polymeric resins at as low a temperature as possible not only to save energy costs and reduce the size of the equipment but also for the reason that such materials require less stabilizer and are more stable due to a lower heat history profile.

Plasticizers can be used not only to render a resin processable but also to impart the desirable effect of lowering processing temperatures whereby the resin can be melted and otherwise worked at a substantially lower temperature. Although plasticizers can be used to gain an advantage, they do have the detrimental effect of reducing certain physical properties of the resins.

Reduction of processing and melting temperature can also be effected in another way—by using the blowing agent as a functional plasticizer. This can be done by mixing the blowing agent with the particulate resin until a sufficient amount thereof is absorbed by the particulate resin. For instance, depending on the degree of chlorination, chlorinated polyvinyl chloride melts at a temperature in excess of about 350° F. However, when solid particulate chlorinated polyvinyl chloride is mixed with a blowing agent, such as a chlorofluoroalkane, it can be melted at about 300° F.

U.S. Pat. No. 3,366,580 to Kraemer et al describes a chlorinated polyvinyl chloride foam that is made by introducing into a pressure vessel chlorinated polyvinyl chloride powder and a chlorofluoroalkane blowing agent. The contents of the vessel are mixed for many hours at an elevated temperature so that, in conjunction with the generated pressure in the vessel, a substantial portion of the blowing agent is maintained in the liquid phase. Upon completion of the absorption step, contents of the vessel are cooled, removed from the vessel and admixed with a nucleating agent before being extruded into a cellular product.

In Col. 3, lines 42 to 50 of U.S. Pat. No. 3,366,580, it is noted that a foam product can be extruded directly from the chlorinated polyvinyl chloride resin without the intermediate step of mixing particulate resin with a blowing agent. Pursuant to this method, a blowing agent is injected into the melted resin as it is advanced through the extruder. It should be noted that this patent does not teach a continuous method for making a cellular product whereby injection of a blowing agent is made into a solid resin.

SUMMARY OF THE INVENTION

This invention relates to a continuous method and apparatus for extruding a cellular resin product at a lower temperature by introducing a particulate polymer resin into the feed section of the extruder, densifying the particulate resin in the compaction section by a screw extruder provided with a conical compacting means, forming a choke of said compacted material to prevent the upstream seepage of a blowing agent, introducing a blowing agent into the particulate resin in the injection section of the extruder where the resin absorbs the blowing agent, agitating while simultaneously melting the mixture of the particulate resin and the blowing agent in the heated mixing section of the extruder, and extruding the mixture through a die into a zone of lower pressure whereby the blowing agent expands to form a cellular product. This can be accomplished using one extruder.

DETAILED DESCRIPTION OF THE INVENTION

A cellular product is prepared by means of a continuous method and apparatus characterized by the injection of a blowing agent into a particulate solid polymer resin and formation of a choke of the resin that is sufficiently compacted to prevent leakage of the blowing agent upstream. This approach facilitates absorption of the blowing agent by the solid resin that makes it possible to melt and process the resin at substantially lower temperature of about 250° to 350° F., which is at least about 50° to 100° F. below the prior art practice.

Figure 1:
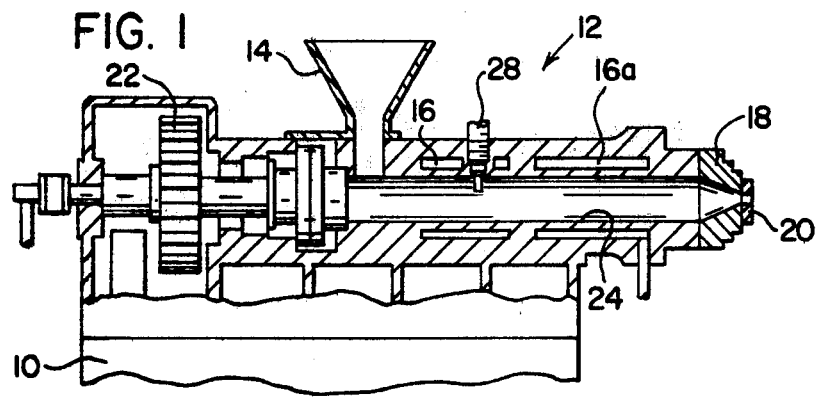
FIG. 1 is a side elevational view with a portion in cross-section of an extruder without a feed screw.
Figure 2:
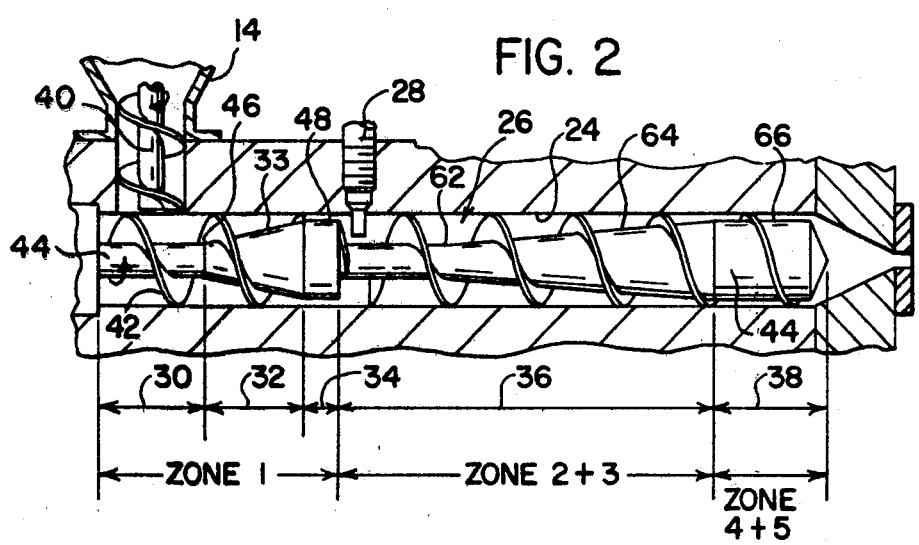
FIG. 2 is a sketch of an extruder and the feed screw illustrating the important aspects of the invention.

The invention disclosed herein pertains to a method for extruding polymeric resin foam of low density and to the extruding apparatus for accomplishing same. The apparatus shown in FIG. 1 includes base 10 of a screw extruder that is generally designated by reference numeral 12. Extruder 12 has a hopper 14, heating means 16 and cooling means 16a for circulating oil, water or another medium, an extruder head 1, a die 20, transmission means 22 driven by a suitable motor, and a barrel or cylinder 24 in which extrusion screw 26, shown in FIG. 2, is journalled for rotation. Injection pipe 28 extends into the extruder just beyond the choke. A blowing agent is introduced through the injection pipe into the particulate resin.

The extrusion screw 26 shown in FIG. 2 comprises, as viewed in a downstream direction, feed section 30, compaction section 32, choke section 34, as well as injection, melting and mixing section 36 and cooling and metering section 38. The first zone of the extruder includes the feed section, compaction section, and the choke section; the second and third zones include the injection, and melting and mixing section whereas zones 4 and 5 include the cooling and metering section. The upstream portion of section 36 provides the function of admitting a blowing agent under pressure into the extruder whereas the downstream portion of section 36 provides for mixing and melting the feed material. The cooling and metering section 38 is where the molten resin is sufficiently cooled to reduce vapor pressure of the blowing agent and where viscosity of the resin is reduced so that it can retain the blowing agent and thus form a low density foam. In the preferred embodiment, the feed, compaction and choke sections are generally 8 to 10 length/diameter (L/D) whereas the remainder of the extruder is about 22 to 24 L/D.

Crammer 40 can be provided in the feed hopper 14 to force particulate feed into the feed section of the extruder. The feed can be in powder form, such as 10 to 600 microns, or in pellet form of about ⅛" to ¼" in size. The powder feed is preferred. The feed screw in the feed section is characterized by helical screw flight 42 of constant pitch disposed on core 44 of constant cross-sectional area terminating at point 46. The particulate feed is introduced into the extruder and deposited in the channels of screw 26. As the feed is conveyed downstream to point 46, it is mixed and more uniformly distributed.

The compaction section 32 commences at point 46 and is defined by a conical section 33 of increasing cross-sectional area when viewed in the downstream direction. The solid particulate feed is compacted as it is moved upwardly along the compaction section by screw flight 42. Compaction is achieved by virtue of the uniformly increasing cross-sectional diameter of core 44 and a concomitant reduction in the channel depth. Since the bulk of the feed in a channel remains constant, compaction thereof is effected by reducing volume of each channel with each revolution of the feed screw.

Choke section 34 is defined by the uniform cross-section 48 of core 44 and cylinder 24 of the extruder. The feed from the compaction section is delivered to the choke section where it forms an annular ring of generally uniform cross-section that is substantially impervious to the blowing agent. Success of this procedure depends on sufficient compaction of the feed material and the use of a crammer 40 in the hopper is of a definite advantage.

In this respect, it is of interest to note that density of chlorinated polyvinyl chloride powder, a suitable feed material, is about 30 pounds per cubic foot. To achieve a substantially impervious barrier to the passage of a gaseous blowing agent, the particulate feed material should be compacted to a density of about 70 to 80 lbs/ft$^3$ and up to about 90 lbs/ft$^3$. Density of solid chlorinated polyvinyl chloride is somewhat above 90 lbs/ft$^3$.

Figure 3:
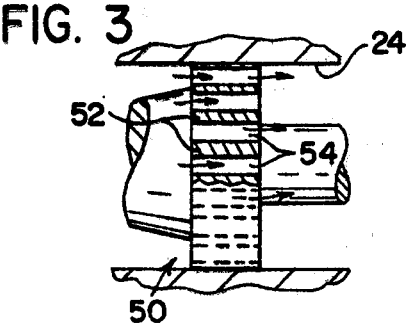
FIG. 3 is a design of an optional choke construction.
Figure 4:
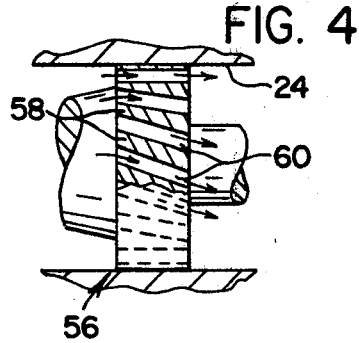
FIG. 4 is an alternate design of the choke construction.

The choke section 34 can be an unobstructed annular area of uniform cross-section formed by surface 48 of core 44 and cylinder 24 or it can take the form of a number of alternate designs, shown in FIGS. 3 and 4. In FIG. 3, a ring 50 is shown disposed on section 48 of core 44 and provided with axial passages 54 spaced by raised portions 52. Ring 50 shown in FIG. 3 can be secured at the terminal extremity of core surface 48 that defines choke 34 with cylinder 24. Ring 50 can be either integral with core 44 or it can be separate and be mounted on core 44. The purpose of ring 50 is to provide a constricting means to achieve greater degree of compaction in the choke section.

FIG. 4 illustrates an alternate ring 56 provided with helical channels 60 spaced by raised portions 58. Ring 56 can be made to function in the same manner as ring 50 of FIG. 3. Rings 50 and 56 can also be provided with spaced teeth that form open passages.

Heating-mixing section 36 is disposed at the upstream portion of the second stage of the extruder. The core of feed screw in the heating-mixing section is of a reduced cross section compared to surface 48. Its diameter generally corresponds to the diameter of the screw in the feed section and is of a uniform cross-section until point 62 is reached. From point 62 downstream, the core of feed screw is defined by conical surface 64 that eventually merges into an enlarged surface 66 of uniform cross-section.

It should be understood that, although a single flight is illustrated in the drawings, multiple flights can also be used. This is especially true if improved mixing is desired. The screw flight is not depicted in the second stage of the extruder in order to more clearly illustrate the design of the feed screw core. The screw flight in the second stage can, likewise, be of constant pitch and multiple flights can be used.

The method for making a foamed product is initiated by continuously feeding particulate polymeric resin into the hopper preferably provided with a crammer. The feed enters the screw extruder in feed section 30 from the hopper and is deposited in the channels of the feed screw. The feed is conveyed downstream by the feed screw that has a constant pitch and a core of uniform cross section. The function of the feed section is to load the feed into the screw extruder and convey it to the compaction section 32 that commences at point 46 on the feed screw and is defined by the conical surface 33 and the cylinder 24. Conical surface 33 increases in cross section in the downstream direction thus reducing the volume in the channels. Compaction of the feed takes place as a result of the concomitant action of the conical surface 33 and cylinder 24 that converge to densify the feed.

Upon compaction, the feed enters choke 34 where it forms a barrier that is substantially impervious to the seepage of a gaseous blowing agent. The barrier is in the form of an annular plug or an open-ended cylinder that is disposed between cylinder 24 and surface 48. The blowing agents, such as trichloromonofluoromethane, are introduced into the extruder under high pressures and are, therefore, in a liquid state. It is self evident that the feed in the choke should preferably be in solid form to form an impervious barrier.

The compacted feed is conveyed through the choke and is delivered in a solid, particulate form into heating-mixing section 36 where it comes in contact with a blowing agent introduced through conduit 28. As already noted, there are certain important advantages in contacting the blowing agent with a feed in solid form rather than molten form. Firstly, the blowing agent is more quickly absorbed by the solid particulate feed than molten feed and secondly, the blowing agent acts like a plasticizer for the feed and lowers its melting temperature substantially. In the case of chlorinated polyvinyl chloride feed and trichloromonofluoro blowing agent, the melting temperature can be reduced by at least about 50° to 100° F.

Heating means is provided in section 36 to melt the feed which is underway by the time point 62 is reached on the feed screw. As the feed is being heated and melted, it is continuously mixed by the screw flight as it is conveyed downstream. To promote better mixing, multiple flights and other means can be provided in the heating-mixing section 36 as well as the cooling-mixing section 38. Melting of the feed is essentially completed at the apex of conical surface 64. During the transition period that takes place over conical surface 64, volume of the feed becomes smaller as the feed is converted from solid to liquid state. Heat transfer efficiency over conical surface 64 is maintained by reducing volume of the channels thereat so that the feed is kept in constant contact with cylinder 24 that is heated in this region.

As conical surface 64 merges into surface 66 of constant cross section, the feed in molten state is introduced into cooling-mixing section 38. Temperature of the molten feed should be reduced to where its viscosity is sufficiently high to retain the blowing agent. If viscosity of the molten feed is too low, it is too thin to retain sufficient amount of the blowing agent. Viscosity that is too high at this stage is generally no problem, one result of such a condition is a higher density foam. Reduction in temperature also has the beneficial effect of reducing vapor pressure of the blowing agent. This effect also contributes to the overall attempt to retain the blowing agent in the resin. Since the extruder is operated under a pressure of 1000 to 5000 psi, the mixture of the molten feed and the blowing agent is advanced through the cooling-mixing section and forced through the extrusion die into a zone of lower pressure whereupon the blowing agent expands to form a cellular product.

The temperature profile of an extruder described herein and operated pursuant to the herein-disclosed procedure varies depending on the many variables such as the feed material, particles size of the feed, throughput rate, quantity of the blowing agent and pressure under which it is injected, size and type of extruder equipment, etc. Generally speaking, however, temperature in the feed compaction and choke sections, that correspond to zone 1, will be in the range of 270° to 300° F.; in the injection, mixing and melting sections, that correspond to zones 2 and 3, the temperature will be in the range of 250° to 300° F.; and in the cooling and metering section, that corresponds to zones 4 and 5, it will be in the range of 200° to 300° F., preferably 200° to 270° F. The temperature zones are referred to in the example herein.

The foamed product made by the method and apparatus described herein should have at least 60% of its cells closed, a density of 1 to 20 pounds per cubic foot, and thermal conductivity of less that 0.20 Btu/(hr)(ft$^2$)(°F./in). In a preferred embodiment, at least 85% of the cells will be closed cells, and the density of the product will be 1 to 10 pounds per cubic foot, most likely less than about 3 pounds per cubic foot.

Suitable feed material is selected from thermoplastic resins that include cellulose ethers and esters; homopolymers and interpolymers of monomeric compounds containing the vinylidene group $CH_2=C<$, such as vinyl halides and vinylidene halides; olefins such as ethylene and propylene; vinyl esters of carboxylic acids such as vinyl acetate and vinyl benzoate; vinyl ethers such as vinyl methyl ether; unsaturated carboxylic acids and derivatives thereof such as acrylic acid and methacrylic acid and esters thereof with alcohols of 1 to 18 carbon atoms such as methyl and ethyl methacrylate, acrylamide, methacrylonitrile, and acrylonitrile; vinyl aromatic compounds such as styrene, alpha-methylstyrene, vinyl toluenes, and vinyl napthalene. The group of vinyl aromatic resins includes styrene homopolymers and styrene interpolymers containing at least 50% by weight styrene and up to 50% by weight of vinylidene monomer interpolymerized therewith, such as butadiene, acrylonitrile, alpha-methylstyrene, and the like. The vinyl chloride resins can be homopolymers or copolymers containing at least 20 mole percent, preferably about 60 mole percent, of vinyl chloride.

The preferred feed resin, in powder or pellet form, is chlorinated polyvinyl chloride with a minimum chlorine content of at least 60% by weight while for practical purposes, the maximum chlorine content feasible is about 75% by weight. Preferably, the chlorine content is about 64 to 73% by weight. As the chlorine content of the resin is increased from 60% to 64%, ability of the resin to tolerate high temperatures is increased from about 80° C. to about 100° C., thus enabling the polymer to better withstand contact with hot objects. Furthermore, increasing chlorine content of the resin from 60% to 64% also makes it easier to retain the blowing agents within the resin. The resin can be stabilized by admixture of known antioxidants and other known additives.

In place of chlorinated polyvinyl chloride, there can be used a mixture of chlorinated polyvinyl chloride with a minor amount of other polymer or copolymer of vinyl chloride with a minor amount of another monomer as long as the properties of the starting material do not differ significantly from those of chlorinated polyvinyl chloride. It is intended that the term "chlorinated polyvinyl chloride", as used herein, include the obvious variations described above.

The chlorinated polyvinyl chloride employed in the present invention can be readily prepared by the post-chlorination of commercially available polyvinyl chloride. Prior to post-chlorination, the polyvinyl chloride generally has a chlorine content of about 56.7% by weight, a glass transition temperature of from about 75° to 80° C., and a density of about 1.40 grams per cubic centimeter. Polyvinyl chloride can be post-chlorinated by a number of procedures including chlorination in a solution; chlorination in an aqueous suspension, or a suspension in a swelling agent; and direct chlorination of dry polyvinyl chloride powder. In our work, it has been found particularly convenient to chlorinate the polyvinyl chloride in an aqueous suspension. A typical procedure for carrying out such a chlorination comprises agitating an aqueous suspension of 15 parts by weight of polyvinyl chloride and 100 parts by weight of water in a pressure vessel which has been purged with nitrogen, heating the suspension to 140° C. and introducing chlorine at a rate of about 2 parts by weight per hour until the polyvinyl chloride has been chlorinated to the desired extent.

Suitable blowing agents are the halogenated hydrocarbons containing 1 to 3 carbon atoms such as methyl chloride, methylene chloride, ethyl chloride, ethylene dichloride, n-propyl chloride, and methyl bromide. A preferred group of halogenated hydrocarbon blowing agents are chlorofluoroalkanes of from 1 to 2 carbon atoms such as trichloromonofluoromethane, dichlorodifluoromethane, dichloromonofluoromethane, monochlorodifluoromethane, trichlorotrifluoroethane, dichlorotetrafluoroethane, and monochlorotrifluoroethane. Although the blowing agent can be used in an amount of about 5% to 50%, it is preferred to have a quantity of blowing agent from about 10% to 40% by weight of the chlorinated polyvinyl chloride absorbed in the polymer at the commencement of the foaming procedure.

The following example is presented to illustrate the invention herein with respect to certain of the details relating to the apparatus and method.

EXAMPLE

To illustrate the invention disclosed herein in more concrete terms, an experiment was conducted using a $3\frac{1}{2}''$ NRM extruder with an L/D of 32:1 and mixing pins provided on upstream and downstream sides of the injection device. The front portion of the screw was oil-cooled. The annular gap in the choke section was $\frac{1}{4}''$ in thickness. The feed formulations comprised 100 parts by weight chlorinated polyvinyl chloride powder containing 67% chlorine, 3 parts of butyl tin heat stabilizer, 3 parts of chlorinated polyethylene, 1.8 parts of lubricant consisting of calcium stearate, ethylene bisstearamide, and an ester of montan wax, 10 parts of styrene-acrylonitrile, processing aid, and 1.3 parts nucleating agent consisting of titanium dioxide and azodicarbonamide. Freon 11 was used as a blowing agent. Operating Data for Runs A, B, and C given in Table I below:

TABLE I

|  | Run A | Run B | Run C |
| --- | --- | --- | --- |
| Temp. (°F.) in Zone 1 | 288 | 287 | 288 |
| Temp. (°F.) in Zone 2 | 297 | 296 | 290 |
| Temp. (°F.) in Zone 3 | 287 | 264 | 273 |
| Temp. (°F.) in Zone 4 | 230 | 249 | 261 |
| Temp. (°F.) in Zone 5 | 204 | 204 | 213 |
| Screw rpm | 18 | 18 | 18 |
| Feed Rate, lbs/hr | 166 | 177 | 164 |
| Head Pressure, psi | 3800/4100 | 3100/3400 | 3000/3400 |
| Pressure in Zones 2 & 3 psi | 1200 | 1200 | 1200 |
| Exit Product Temp., °F. | — | 289 | 286 |
| Crammer Rate, rpm | 25 | 29 | 31 |
| Screw Oil Temp., °F. | 280 | 275 | 270 |
| Screw Oil Rate, lbs/hr | 15 | 15 | 15 |
| Blowing Agent Rate, lbs/hr | 24 | 31.5 | 30 |
| Injection Pr. of Bl. Agent, psi | 2500/2700 | 2600/2800 | 2800/3000 |

The density of the products produced in Runs A, B and C varied from 2 to 2.5 pounds per cubic foot.

I claim:

1. A method for extruding a cellular polymeric resin comprising the steps of charging a particulate polymeric resin into an extruder having disposed therein an elongated screw, conveying said particulate resin through the extruder, densifying said particulate resin in a compaction section, forming a continually moving barrier in the form of a cylindrical plug of a uniform thickness of said densified resin that is substantially impervious to a blowing agent at a location downstream of the compaction section, injecting a blowing agent downstream of the barrier into said solid particulate resin, mixing said solid particulate resin and said blowing agent, melting said mixture of said resin and said blowing agent, and extruding said molten mixture into a zone of lower pressure whereupon the blowing agent expands within said molten resin to form a cellular product.

2. Method of claim 6 wherein said polymeric resin is selected from thermoplastic resins and said blowing agent is selected from chlorofluoroalkanes of 1 to 2 carbon atoms.

3. Method of claim 1 wherein said polymeric resin is chlorinated polyvinyl chloride and said blowing agent is a chlorofluoromethane.

4. Method of claim 3 including the step of heating said mixture of solid particulate resin and blowing agent in the mixing section while mixing same, and then cooling said molten mixture while mixing same in order to lower viscosity thereof and to lower vapor pressure of said blowing agent so that said blowing agent is retained thereby, said particulate resin is a chlorinated polyvinyl chloride powder.

5. In an extrusion apparatus for processing a particulate polymeric feed comprising a cylinder, an extrusion screw rotatably mounted in said cylinder and longitudinally disposed therein for advancing the feed therethrough and for progressively changing the feed from a solid to a molten form, said apparatus is divided into a feed section where the feed is introduced into said apparatus, a compaction section where the feed is densified, a choke section of reduced cross section formed by said extrusion screw having a core of constant cross-section in said choke section and said cylinder containing compacted feed that is substantially impervious to the passage of a blowing agent, a conical section integral with said screw and being upstream of said choke section providing a gradual transition between the upstream portion of said extrusion screw and said choke section, injection means located downstream of said choke section for introducing a blowing agent into said apparatus whereby the blowing agent is mixed with the feed in a solid state, a mixing section disposed downstream of said choke section where the particulate feed and the blowing agent are mixed and then melted, and an extrusion die at the downstream end of said apparatus through which the molten feed and the admixed blowing agent are forced through into a zone of lower pressure whereupon the blowing agent expands to form a cellular product.

6. Apparatus of claim 5 wherein said compaction section is characterized by an extrusion screw with a core of increasing cross section.

7. Apparatus of claim 6 wherein said mixing section includes a heating-mixing section and a downstream cooling-mixing section where the particulate feed in a solid state is initially mixed with the blowing agent and then progressively heated to melt the mixture of the feed and the blowing agent and then cooled to increase viscosity of the molten feed for efficient foaming thereof.

8. Apparatus of claim 5 wherein said compaction section is defined by said cylinder and a conical surface of increasing cross-section in the downstream direction provided on said screw, said choke section is defined by said cylinder and a surface of enlarged uniform cross-section provided on said screw that merges into said conical surface at the upstream extremity, said injection conduit is positioned downstream of said choke section at a location in said apparatus where the feed is in a solid state.

9. Apparatus of claim 7 wherein said compaction section is defined by said cylinder and a conical surface of increasing cross-section in the downstream direction provided on said screw, said choke section is defined by an annular section between said cylinder and the core of said screw wherein said annular section is rotatable with said screw and is provided with a plurality of openings providing communication therethrough, said injection conduit is positioned downstream of said choke section at a location in said apparatus where the feed is in a solid state.

10. Apparatus of claim 8 wherein said feed section is characterized by said screw with a core of uniform cross section; said mixing section is characterized by said screw having a core of uniform cross section of lesser cross section than said choke section that merges into a conical surface of increasing cross section in the downstream direction and then into a surface of enlarged uniform cross section; said feed, compaction and choke sections are about 8 to 10 L/D whereas the remainder of the extruder is about 22 to 24 L/D; and said particulate polymeric feed is in powder form that has a density of about 70 to 80 lbs/ft$^3$ in said choke section.

* * * * *